(12) United States Patent
Chang (10) Patent No.: US 6,808,164 B2
(45) Date of Patent: Oct. 26, 2004

(54) ROPE TENSIONING DEVICE

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/377,531

(22) Filed: May 22, 2003

(65) Prior Publication Data

US 2004/0118961 A1 Jun. 24, 2004

(30) Foreign Application Priority Data

Dec. 24, 2002 (TW) ........................................ 91221168 U (51) Int. Cl.[7] .................................................. B66D 3/02
(52) U.S. Cl. ........................ 254/217; 254/218; 254/223; 254/369; 254/376
(58) Field of Search .................................. 254/217, 218, 254/223, 369, 376; 242/388.1; 24/71 CT (56) References Cited

U.S. PATENT DOCUMENTS

| | | | | | |
|---|---|---|---|---|---|
| 1,466,784 A | * | 9/1923 | Brautigam | .................. | 254/369 |
| 2,638,314 A | * | 5/1953 | McFerren et al. | .......... | 254/216 |
| 2,890,857 A | * | 6/1959 | Hoffman | ..................... | 254/369 |
| 3,003,359 A | * | 10/1961 | Felder | ........................ | 74/142 |
| 4,723,757 A | * | 2/1988 | Steinman et al. | ........... | 254/369 |
| 5,271,606 A | * | 12/1993 | Kamper | ..................... | 254/217 |

* cited by examiner

Primary Examiner—Kathy Matecki
Assistant Examiner—Sang Kim (57) ABSTRACT

A rope tensioning device includes a support base, a handle, a connecting post, two fixing plates, two ratchet wheels, two locking blocks, two shafts, a snap ring, two elastic members, two insertion pins, a bolt, a nut, and a fixing pin. Thus, the rope tensioning device can be assembled rapidly and conveniently, thereby greatly reducing costs of assembly. In addition, the rope tensioning device can wind and unwind the rope easily, conveniently and rapidly.

18 Claims, 11 Drawing Sheets

ROPE TENSIONING DEVICE

BACKGROUND OF THE INVENTION

1. Field of the Invention

The present invention relates to a rope tensioning device, and more particularly to a rope tensioning device that can be assembled easily, rapidly and conveniently, thereby greatly reducing costs of assembly.

2. Description of the Related Art

A conventional rope tensioning device in accordance with the prior art is disclosed in the Taiwanese Patent Publication No. 230439, and comprises a rope holding device for holding the rope, and a rope clamping device for tightening the rope. The rope can be detached from the conventional rope tensioning device after the pull bar on the suspension hook is loosened. However, the conventional rope tensioning device has a complicated construction, thereby increasing costs of fabrication and assembly. In addition, the conventional rope tensioning device cannot be assembled easily and conveniently. Further, the conventional rope tensioning device cannot be operated easily and rapidly.

SUMMARY OF THE INVENTION

The present invention is to mitigate and/or obviate the disadvantage of the conventional rope tensioning device.

The primary objective of the present invention is to provide a rope tensioning device that can be assembled rapidly and conveniently, thereby greatly reducing costs of fabrication and assembly.

Another objective of the present invention is to provide a rope tensioning device that can wind and unwind the rope easily, conveniently and rapidly.

A further objective of the present invention is to provide a rope tensioning device that has a simplified construction.

In accordance with the present invention, there is provided a rope tensioning device, comprising a support base, a handle, a connecting post, two shafts, two fixing plates, two ratchet wheels, a fixing pin, and two locking blocks, and wherein:

- the support base has two side walls having a first end formed with a first through hole and a second end formed with a second through hole, the first end of each of the two side walls of the support base has a top formed with a stepped portion and has a periphery formed with a passage hole, each of the two side walls of the support base has a mediate portion formed with an arcuate recess;
- the handle is pivotally mounted on the support base and has one end formed with a connecting portion, the connecting portion of the handle has two side plates each formed with a first through hole and a second through hole, each of the two side plates of the connecting portion of the handle has a top formed with a protrusion;
- the connecting post is extended through the second through hole of the connecting portion of the handle, the connecting post has two semi-circular fitting portions formed on the two opposite ends thereof;
- each of the two shafts is extended through the first through hole of each of the two side walls of the support base and through the first through hole of each of the two side plates of the connecting portion of the handle;
- each of the two fixing plates is mounted on the two combined shafts, each of the two fixing plates has a first end formed with an opening and a second end formed with a passage hole for passage of the two combined shafts, the first end of each of the two fixing plates has a corner formed with a through hole;
- each of the two ratchet wheels is secured on the two combined shafts for rotating the two combined shafts, each of the two ratchet wheels is engaged with a respective one of the two fitting portions of the connecting post;
- the fixing pin is extended through the passage hole of each of the two side walls of the support base and through the through hole of each of the two fixing plates; and
- each of the two locking blocks is pivotally mounted on the fixing pin, each of the two locking blocks has an end locked on a respective one of the two ratchet wheels.

Further benefits and advantages of the present invention will become apparent after a careful reading of the detailed description with appropriate reference to the accompanying drawings.

DETAILED DESCRIPTION OF THE INVENTION

Figure 1:
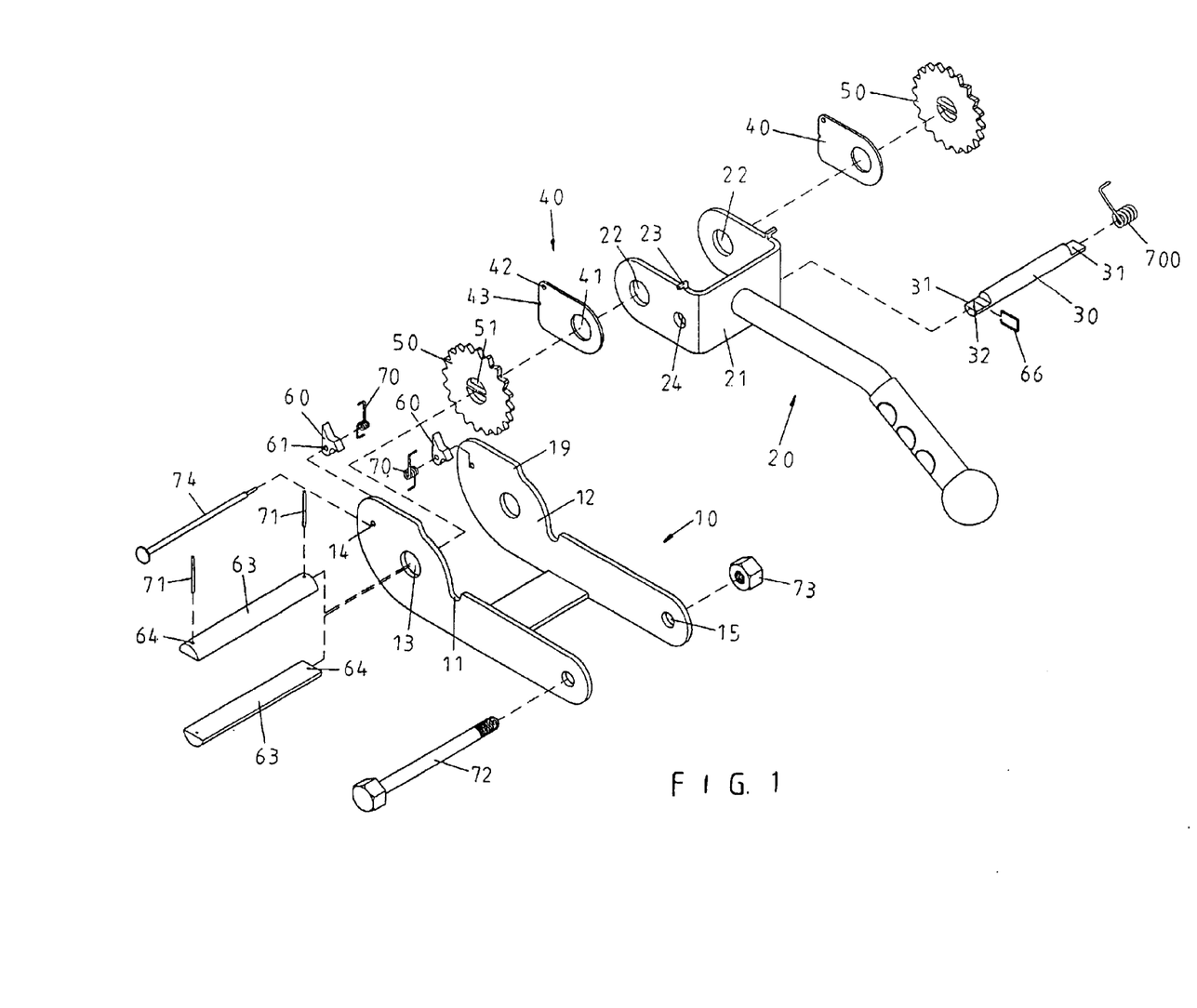
FIG. 1 is an exploded perspective view of a rope tensioning device in accordance with a first embodiment of the present invention.
Figure 2:
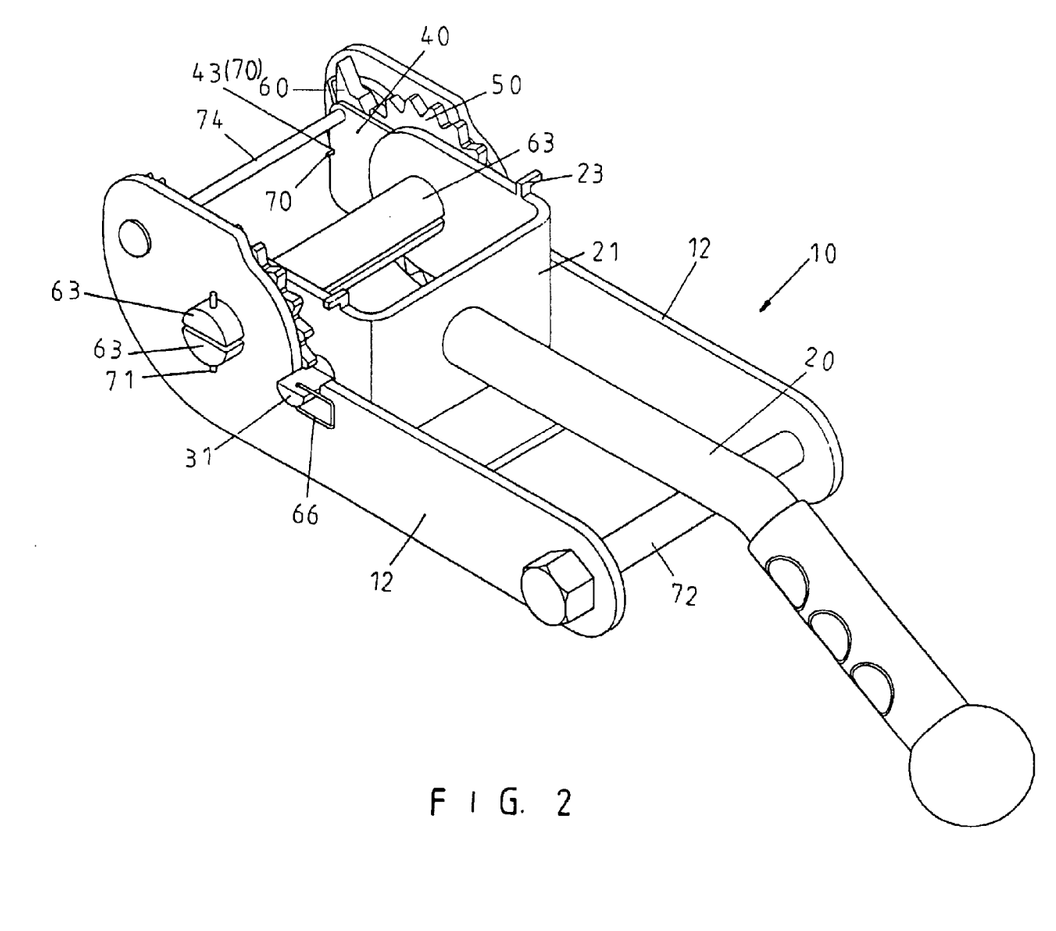
FIG. 2 is a perspective assembly view of the rope tensioning device in accordance with the first embodiment of the present invention.
Figure 3:
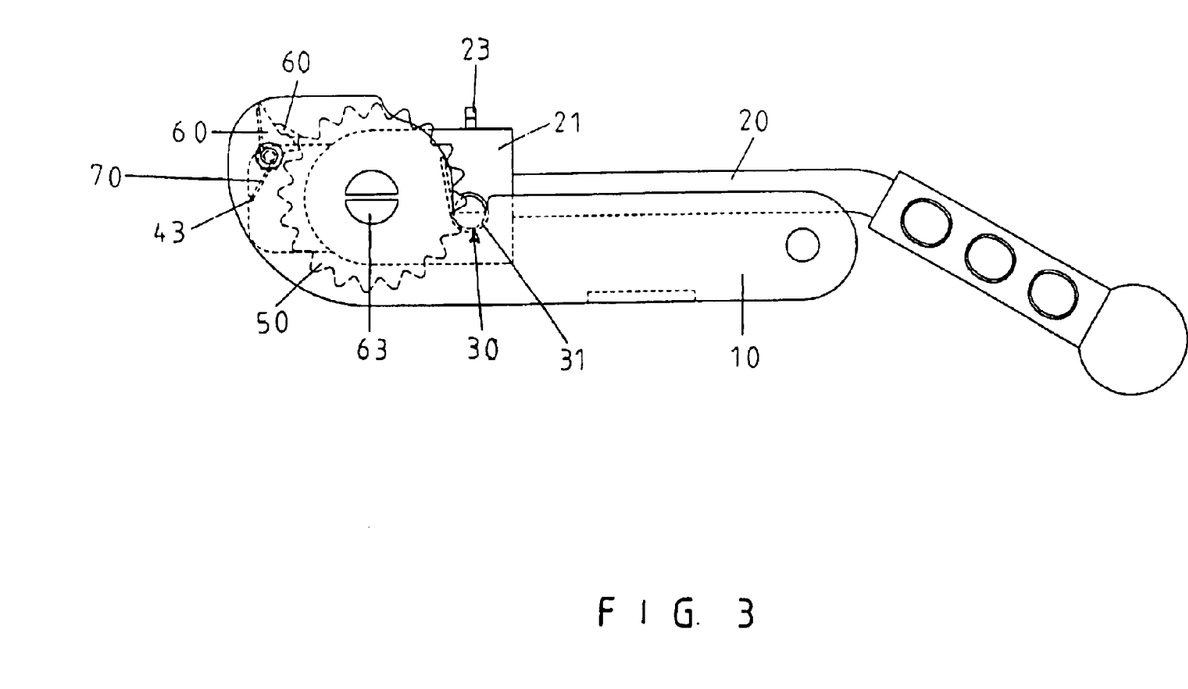
FIG. 3 is a side plan view of the rope tensioning device as shown in FIG. 2.
Figure 4:
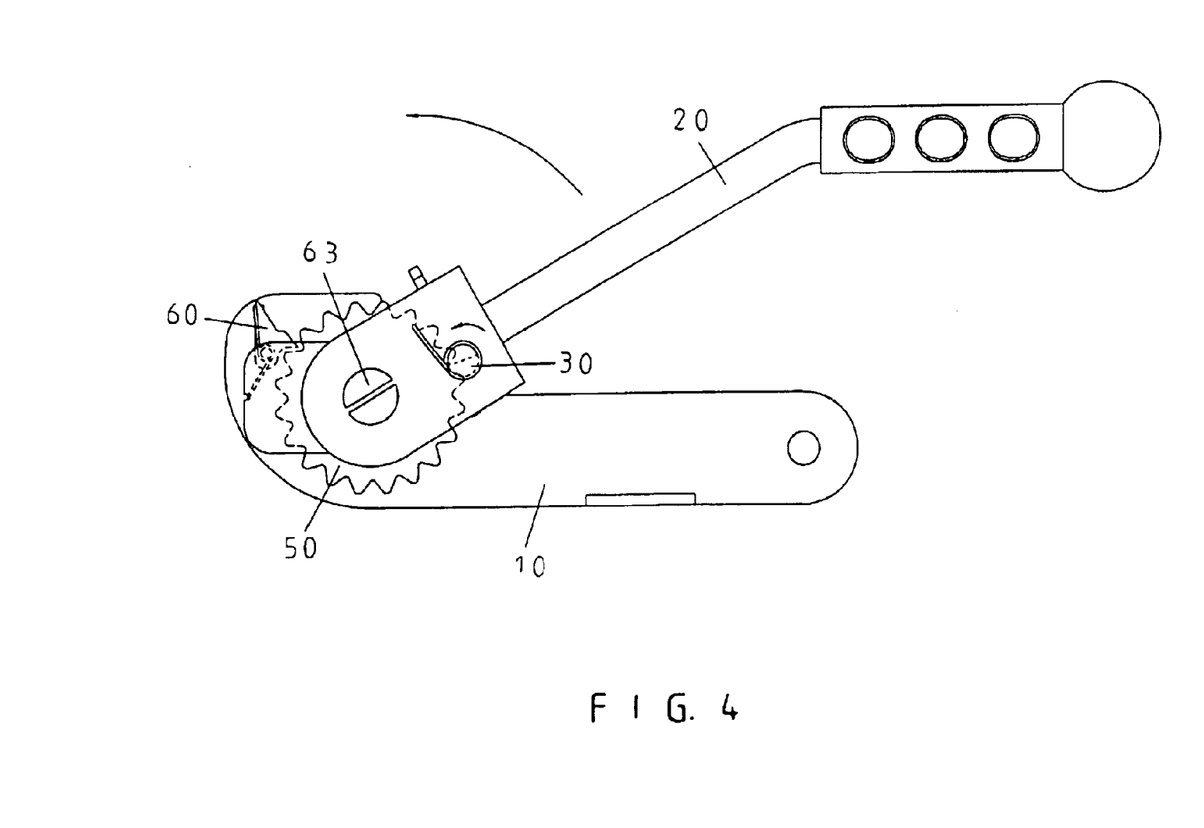
FIG. 4 is a schematic operational view of the rope tensioning device as shown in FIG. 3.
Figure 4A:
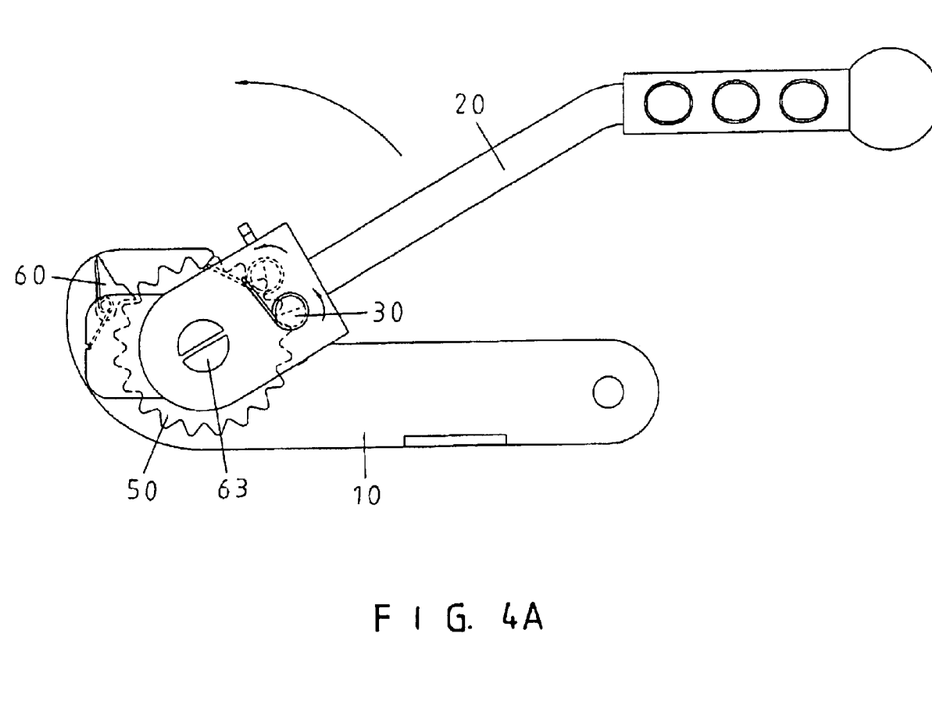
FIG. 4A is a schematic operational view of the rope tensioning device as shown in FIG. 3.

Referring to the drawings and initially to FIGS. 1–3, a rope tensioning device in accordance with a first embodiment of the present invention comprises a support base 10, a handle 20, a connecting post 30, two fixing plates 40, two ratchet wheels 50, two locking blocks 60, two shafts 63, a snap ring 66, two elastic members 70, two insertion pins 71, a bolt 72, a nut 73, and a fixing pin 74.

The support base 10 is substantially H-shaped. The support base 10 has two side walls 12 each having a first end formed with a first through hole 13 and a second end formed with a second through hole 15. The first end of each of the two side walls 12 of the support base 10 has a top formed with a stepped portion 19. The first end of each of the two side walls 12 of the support base 10 has a periphery formed with a passage hole 14. Each of the two side walls 12 of the support base 10 has a mediate portion formed with an arcuate recess 11.

The handle 20 is pivotally mounted on the support base 10. The handle 20 is substantially V-shaped. The handle 20 has one end formed with a substantially U-shaped connecting portion 21. The connecting portion 21 of the handle 20 has two side plates each formed with a first through hole 22 and a second through hole 24. Each of the two side plates of the connecting portion 21 of the handle 20 has a top formed with an L-shaped protrusion 23.

The connecting post 30 is mounted on the connecting portion 21 of the handle 20. Preferably, the connecting post 30 is extended through the second through hole 24 of the connecting portion 21 of the handle 20. The connecting post 30 has two semi-circular fitting portions 31 formed on the two opposite ends thereof. One of the two fitting portions 31 of the connecting post 30 is formed with a retaining hole 32.

The snap ring 66 is mounted on one of the two fitting portions 31 of the connecting post 30 and has a distal end secured in the retaining hole 32 of the connecting post 30. An elastic member 700 is mounted on the other one of the two fitting portions 31 of the connecting post 30.

Each of the two shafts 63 is substantially semi-circular shape. Each of the two shafts 63 is extended through the first through hole 13 of each of the two side walls 12 of the support base 10 and through the first through hole 22 of each of the two side plates of the connecting portion 21 of the handle 20, so that the handle 20 is pivotally mounted on the support base 10. Each of the two shafts 63 has two opposite ends each formed with a through hole 64 for passage of an insertion pin 71.

Each of the two fixing plates 40 is mounted on the two combined shafts 63. Each of the two fixing plates 40 has a first end formed with an opening 43 and a second end formed with a passage hole 41 for passage of the two combined shafts 63. The first end of each of the two fixing plates 40 has a corner formed with a through hole 42.

Each of the two ratchet wheels 50 is secured on the two combined shafts 63 for rotating the two combined shafts 63. Each of the two ratchet wheels 50 has a center formed with two spaced opposite semi-circular passage holes 51 for passage of the two combined shafts 63. In addition, each of the two ratchet wheels 50 is engaged with a respective one of the two fitting portions 31 of the connecting post 30.

The fixing pin 74 is mounted on the two side walls 12 of the support base 10. The fixing pin 74 is extended through the passage hole 14 of each of the two side walls 12 of the support base 10 and through the through hole 42 of each of the two fixing plates 40.

Each of the two locking blocks 60 is substantially Y-shaped. Each of the two locking blocks 60 is pivotally mounted on the fixing pin 74. Each of the two locking blocks 60 is formed with a through hole 61 for passage of the fixing pin 74. Each of the two locking blocks 60 has an end locked on a respective one of the two ratchet wheels 50.

Each of the two elastic members 70 is pivotally mounted on the fixing pin 74. Each of the two elastic members 70 has a first end and a second end each locked in the through hole 42 and the opening 43 of a respective one of the two fixing plates 40 respectively.

The bolt 72 is extended through the second through hole 15 of each of the two side walls 12 of the support base 10 and has a distal end screwed with the nut 73.

In assembly, each of the two shafts 63 is in turn extended through the first through hole 13 of each of the two side walls 12 of the support base 10, each of the two passage holes 51 of each of the two ratchet wheels 50, the passage hole 41 of each of the two fixing plates 40, and through the first through hole 22 of each of the two side plates of the connecting portion 21 of the handle 20, so that the handle 20 is pivotally mounted on the support base 10. Then, each of the two insertion pins 71 is inserted into the through hole 64 of a respective one of the two opposite ends of each of the two shafts 63, thereby combining the two shafts 63 together.

Then, the connecting post 30 is extended through the second through hole 24 of the connecting portion 21 of the handle 20, so that the connecting post 30 is mounted on the connecting portion 21 of the handle 20. At this time, each of the two ratchet wheels 50 is engaged with a respective one of the two fitting portions 31 of the connecting post 30. Then, the snap ring 66 is mounted on one of the two fitting portions 31 of the connecting post 30 with its distal end secured in the retaining hole 32 of the connecting post 30. Then, the elastic member 700 is mounted on the other one of the two fitting portions 31 of the connecting post 30.

Then, the fixing pin 74 is in turn extended through the passage hole 14 of each of the two side walls 12 of the support base 10, the through hole 61 of each of the two locking blocks 60, each of the two elastic members 70, and through the through hole 42 of each of the two fixing plates 40. At this time, each of the two elastic members 70 has a first end and a second end each locked in the through hole 42 and the opening 43 of a respective one of the two fixing plates 40 respectively.

Then, the bolt 72 is extended through the second through hole 15 of each of the two side walls 12 of the support base 10 with its distal end screwed with the nut 73, thereby forming the rope tensioning device in accordance with the first embodiment of the present invention shown in FIG. 2.

In operation, referring to FIGS. 3, 4, 4A, 5 and 6 with reference to FIGS. 1 and 2, when the handle 20 is pivoted forward (in the counterclockwise direction shown in FIGS. 4 and 4A), each of the two ratchet wheels 50 is locked by the respective locking block 60 (see FIGS. 4 and 4A), so that the connecting post 30 mounted on the connecting portion 21 of the handle 20 is pushed away by the two ratchet wheels 50, thereby producing an idling action. In such a manner, the handle 20 can be moved forward successively. At this time, two ratchet wheels 50 are not driven by movement of the handle 20 (see FIGS. 4 and 4A).

Figure 5:
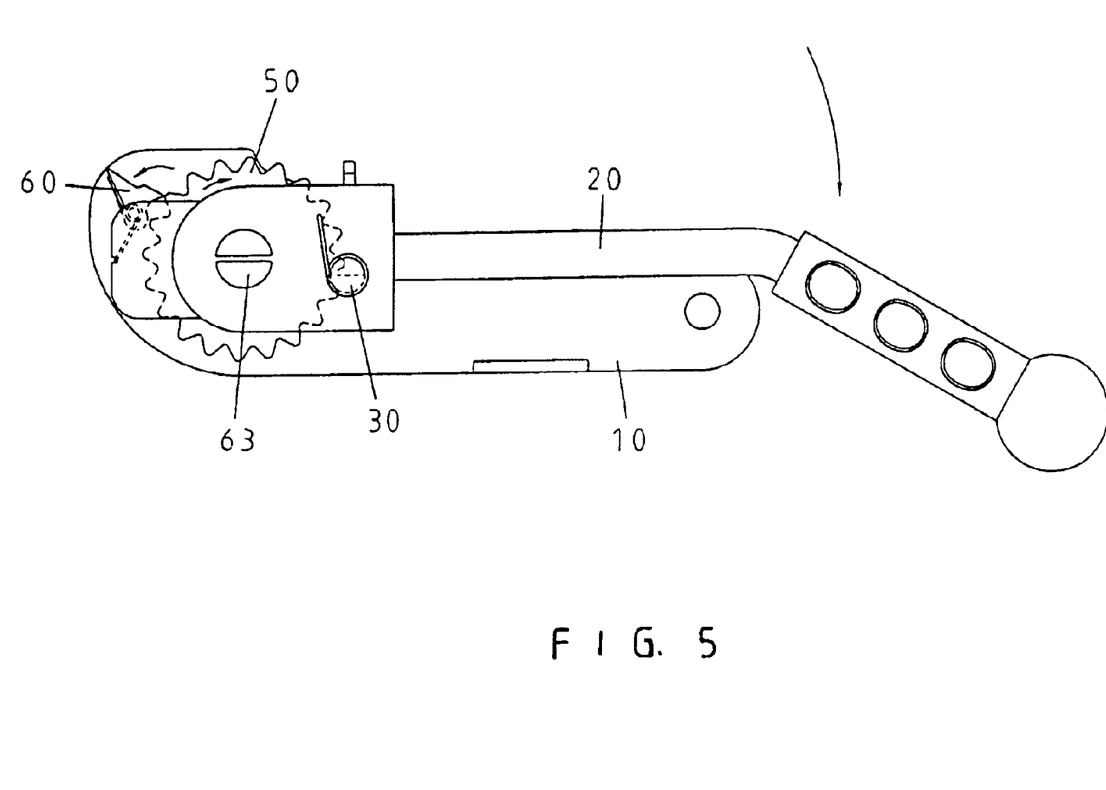
FIG. 5 is a schematic operational view of the rope tensioning device as shown in FIG. 3.

When the handle 20 is pivoted downward (in the clockwise direction shown in FIG. 5), each of the two ratchet wheels 50 is detached from the respective locking block 60, so that each of the two ratchet wheels 50 can be driven and rotated (in the clockwise direction shown in FIG. 5) by the respective fitting portion 31 of the connecting post 30 to pivot and push away the respective locking block 60 (the respective locking block 60 is pivoted in the counterclockwise direction shown in FIG. 5). In such a manner, the two combined shafts 63 can be driven by the two ratchet wheels 50 to rotate rapidly, so as to wind the rope rapidly. In addition, the two locking blocks 60 can be used to prevent the two ratchet wheels 50 from being rotated in the reverse direction (in the counterclockwise direction shown in FIG. 5).

Figure 6:
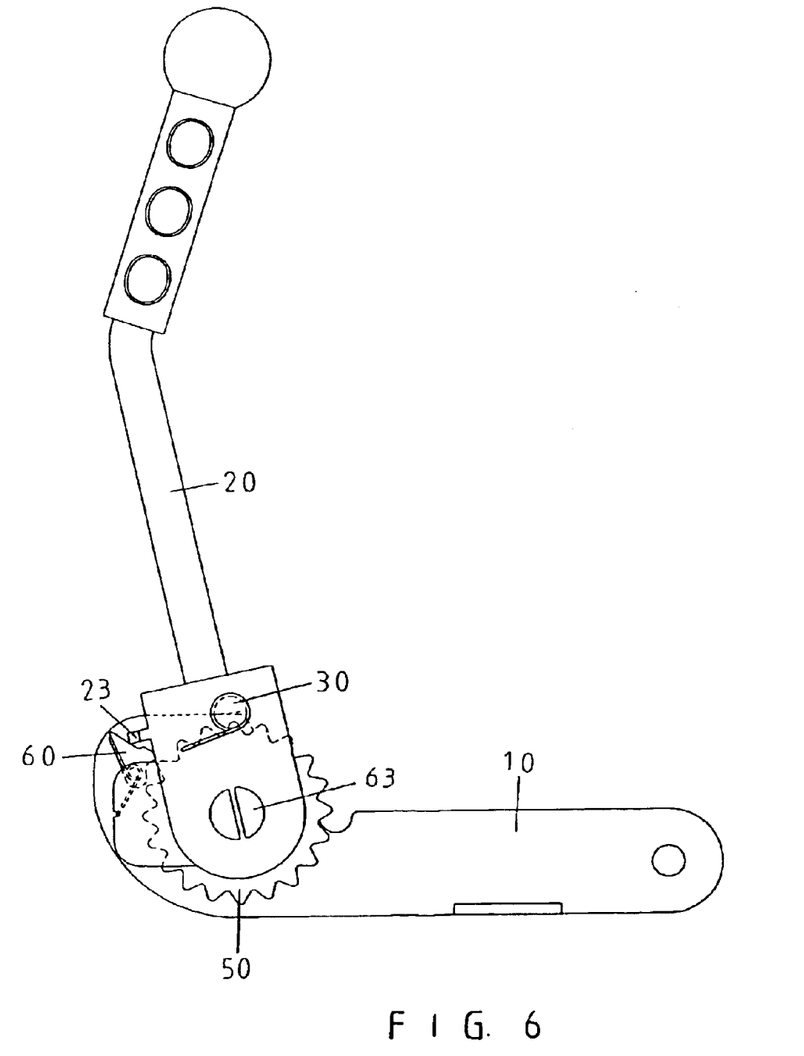
FIG. 6 is a schematic operational view of the rope tensioning device as shown in FIG. 3.

As shown in FIG. 6, the protrusions 23 of the connecting portion 21 of the handle 20 are moved to push away the two locking blocks 60, thereby detaching each of the two ratchet wheels 50 from the respective locking block 60. At the same time, each of the two fitting portions 31 of the connecting post 30 is pushed away by the respective stepped portion 19 of the support base 10, thereby detaching each of the two ratchet wheels 50 from the respective fitting portion 31 of the connecting post 30. In such a manner, the two ratchet wheels 50 can be rotated freely, so that the two combined shafts 63 can be rotated rapidly, so as to unwind the rope rapidly.

In addition, the snap ring 66 can be rotated to rotate the respective fitting portion 31 of the connecting post 30 so as to rotate the connecting post 30, so that the handle 20 can be returned to the original position shown in FIG. 3. Further, the fixing pin 74 is used to support the support base 10, thereby preventing the support base 10 from being distorted or deformed during operation. Further, the fixing pin 74 is used to guide the rope.

Figure 7:
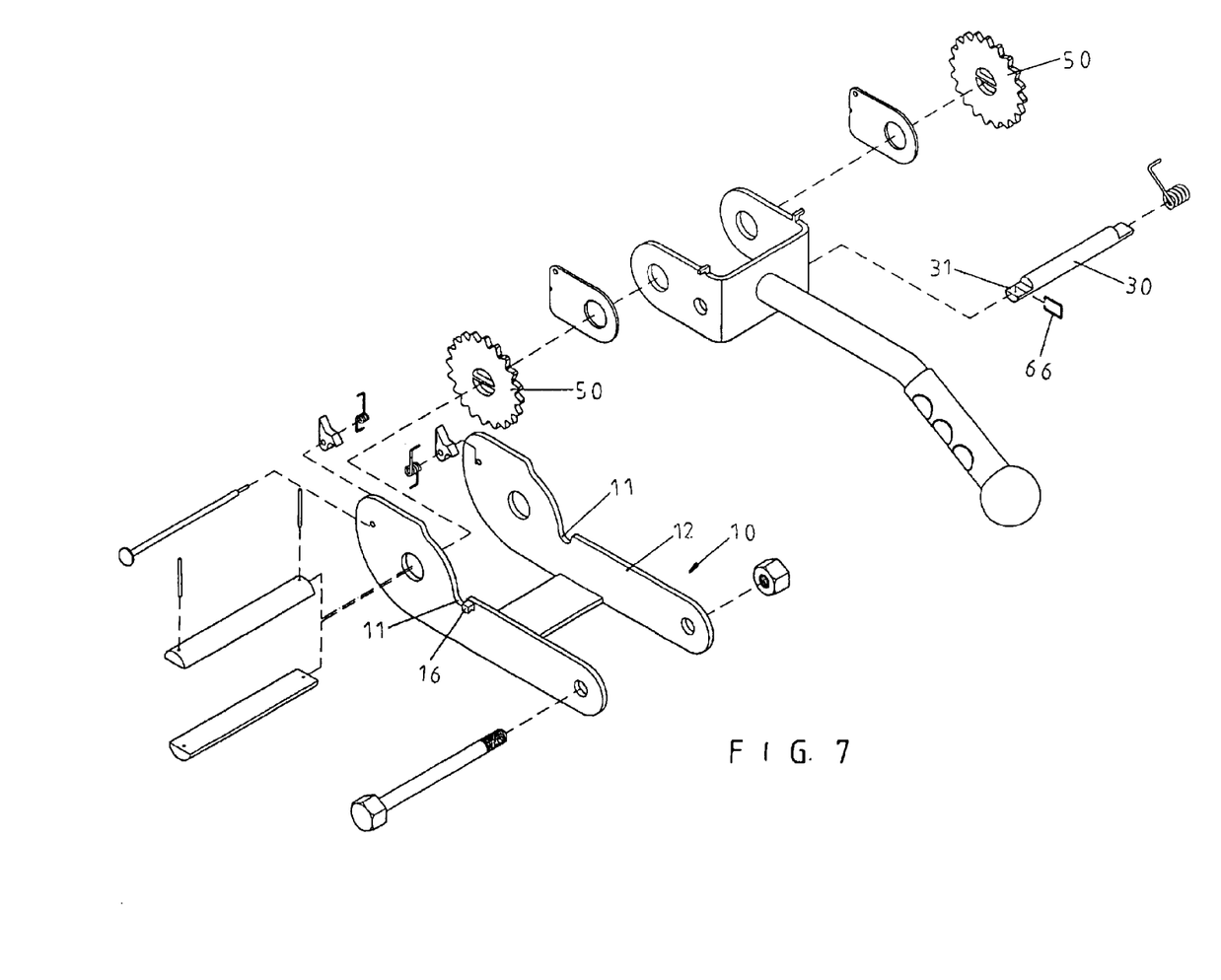
FIG. 7 is an exploded perspective view of a rope tensioning device in accordance with a second embodiment of the present invention.

Referring to FIG. 7, the rope tensioning device in accordance with a second embodiment of the present invention is shown, wherein one of the two side walls 12 of the support base 10 is formed with a locking block 16 located beside the arcuate recess 11. Thus, the snap ring 66 can be locked on the locking block 16, so that each of the two fitting portions 31 of the connecting post 30 is fixed by the snap ring 66 and can be used to fix the respective ratchet wheel 50 without slip.

Figure 8:
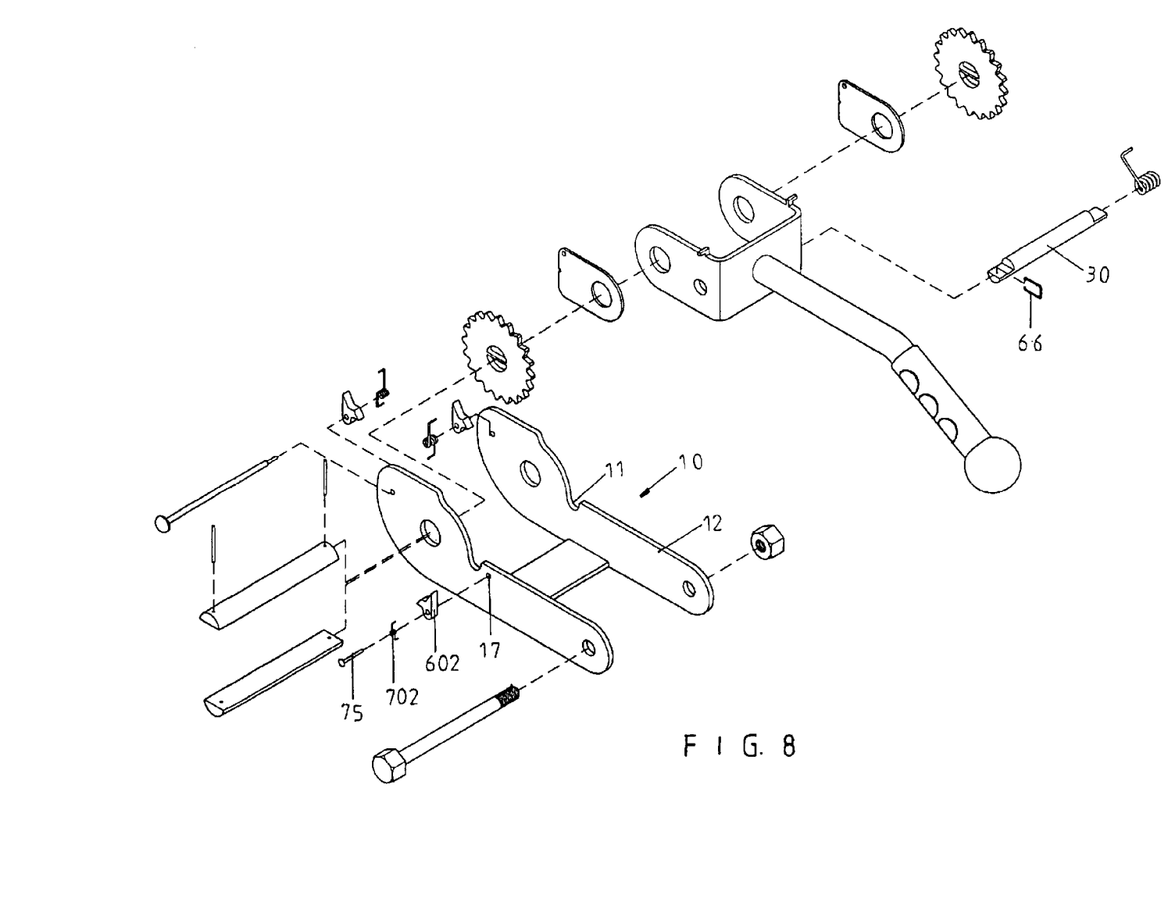
FIG. 8 is an exploded perspective view of a rope tensioning device in accordance with a third embodiment of the present invention.

Referring to FIG. 8, the rope tensioning device in accordance with a third embodiment of the present invention is shown, wherein one of the two side walls 12 of the support base 10 is formed with a passage hole 17 located beside the arcuate recess 11 for passage of a rivet 75 which is extended through an elastic member 702 and a locking block 602. Thus, the snap ring 66 can be locked on the locking block 602, so that each of the two fitting portions 31 of the connecting post 30 is fixed by the snap ring 66 and can be used to fix the respective ratchet wheel 50 without slip.

Figures 9, 9A:
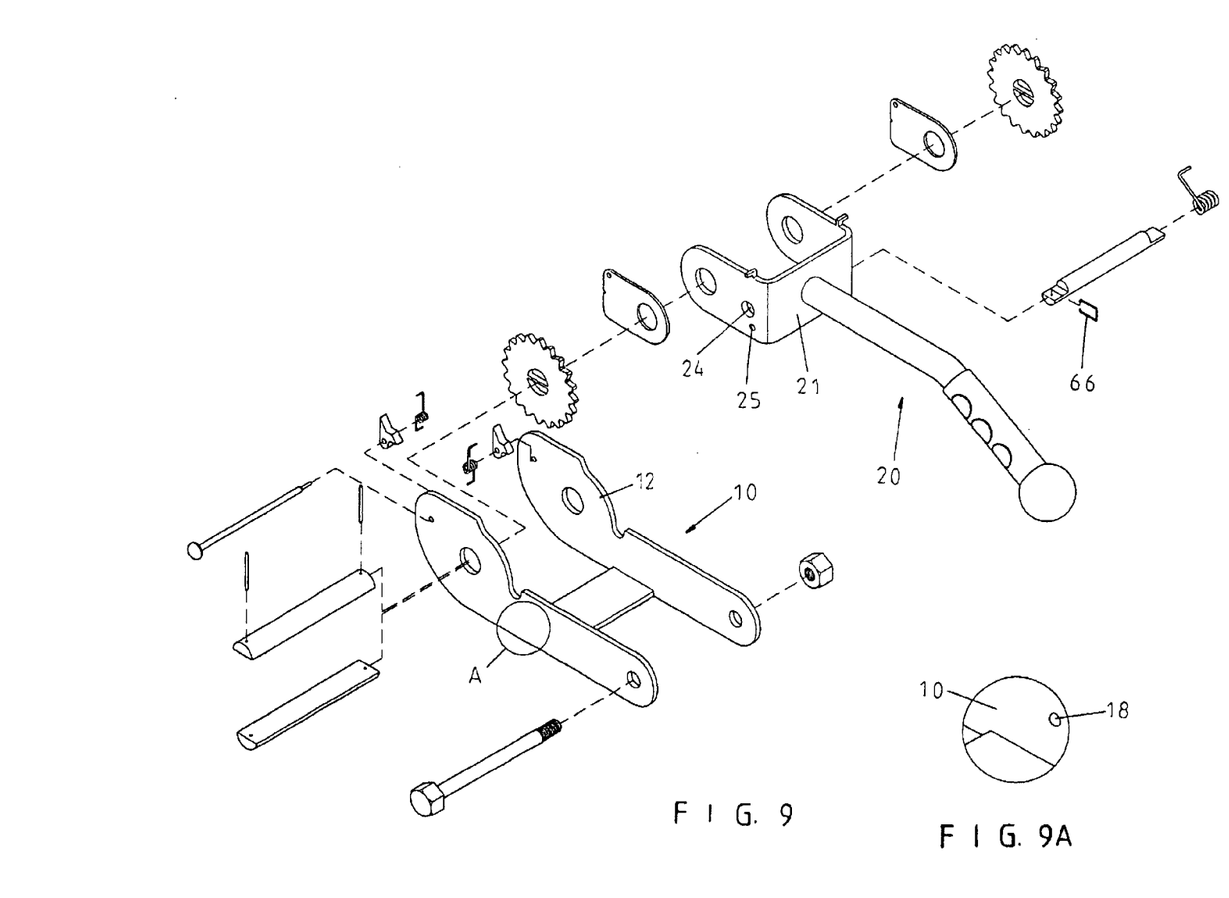
FIG. 9 is an exploded perspective view of a rope tensioning device in accordance with a fourth embodiment of the present invention.
FIG. 9A is a partially enlarged view of the rope tensioning device as shown in FIG. 9.

Referring to FIGS. 9 and 9A, the rope tensioning device in accordance with a fourth embodiment of the present invention is shown, wherein one of the two side walls 12 of the support base 10 has an inner side formed with a boss 18, and one of the two side plates of the connecting portion 21 of the handle 20 has an outer side formed with a locking hole 25 for locking the boss 18 of the support base 10, so that the two ratchet wheels 50 are fixed without slip.

Figure 10:
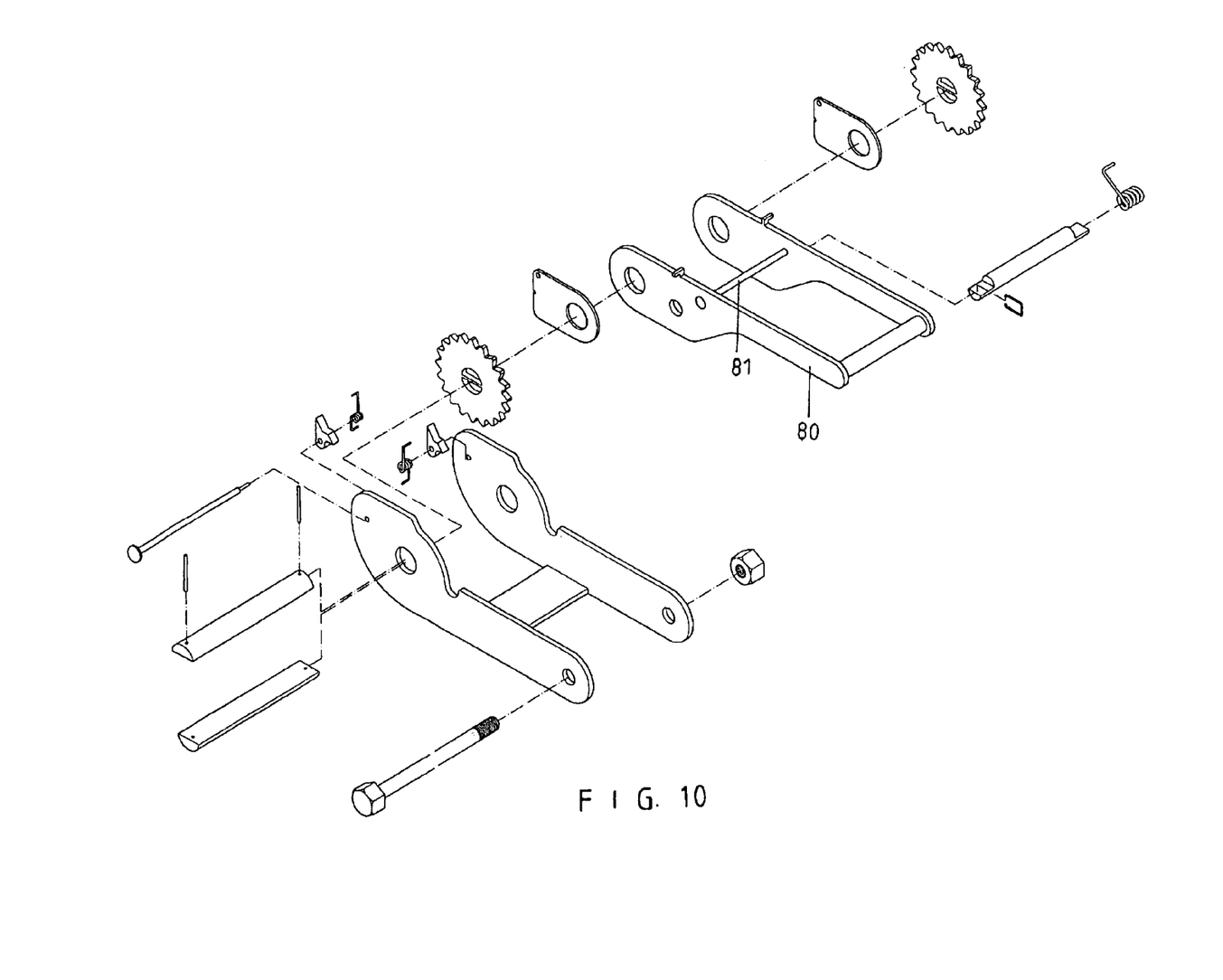
FIG. 10 is an exploded perspective view of a rope tensioning device in accordance with a fifth embodiment of the present invention.

Referring to FIG. 10, the rope tensioning device in accordance with a fifth embodiment of the present invention is shown, wherein the handle 20 is replaced by a substantially U-shaped handle 80 which has a mediate portion provided with a fixing pin 81.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A rope tensioning device, comprising a support base, a handle, a connecting post, two shafts, two fixing plates, two ratchet wheels, a fixing pin, and two locking blocks, wherein:

the support base has two side walls having a first end formed with a first through hole and a second end formed with a second through hole, the first end of each of the two side walls of the support base has a top formed with a stepped portion and has a periphery formed with a passage hole, each of the two side walls of the support base has a mediate portion formed with an arcuate recess;

the handle is pivotally mounted on the support base and has one end formed with a connecting portion, the connecting portion of the handle has two side plates each formed with a first through hole and a second through hole, each of the two side plates of the connecting portion of the handle has a top formed with a protrusion;

the connecting post is extended through the second through hole of the connecting portion of the handle, the connecting post has two semi-circular fitting portions formed on the two opposite ends thereof;

each of the two shafts is extended through the first through hole of each of the two side walls of the support base and through the first through hole of each of the two side plates of the connecting portion of the handle;

each of the two fixing plates is mounted on the two shafts, each of the two fixing plates has a first end formed with an opening and a second end formed with a passage hole for passage of the two shafts, the first end of each of the two fixing plates has a corner formed with a through hole;

each of the two ratchet wheels is secured on the two shafts for rotating the two shafts, each of the two ratchet wheels is engaged with a respective one of the two fitting portions of the connecting post;

the fixing pin is extended through the passage hole of each of the two side walls of the support base and through the through hole of each of the two fixing plates; and each of the two locking blocks is pivotally mounted on the fixing pin, each of the two locking blocks has an end which locks a respective one of the two ratchet wheels.

2. The rope tensioning device in accordance with claim 1, wherein the support base is substantially H-shaped.

3. The rope tensioning device in accordance with claim 1, wherein the handle is substantially V-shaped.

4. The rope tensioning device in accordance with claim 1, wherein the connecting portion of the handle is substantially U-shaped.

5. The rope tensioning device in accordance with claim 1, wherein the protrusion of each of the two side plates of the connecting portion of the handle is substantially L-shaped.

6. The rope tensioning device in accordance with claim 1, wherein one of the two fitting portions of the connecting post is formed with a retaining hole, and the rope tensioning device further comprises a snap ring mounted on one of the two fitting portions of the connecting post and having a distal end secured in the retaining hole of the connecting post.

7. The rope tensioning device in accordance with claim 6, further comprising an elastic member mounted on the other one of the two fitting portions of the connecting post.

8. The rope tensioning device in accordance with claim 6, wherein one of the two side walls of the support base is formed with a locking block located beside the arcuate recess for locking the snap ring.

9. The rope tensioning device in accordance with claim 6, wherein one of the two side walls of the support base is formed with a passage hole located beside the arcuate recess for passage of a rivet which is extended through an elastic member and a locking block, so that the snap ring can be locked on the locking block.

10. The rope tensioning device in accordance with claim 1, wherein each of the two shafts is substantially semi-circular shape.

11. The rope tensioning device in accordance with claim 10, wherein each of the two ratchet wheels has a center formed with two spaced opposite semi-circular passage holes for passage of the two shafts.

12. The rope tensioning device in accordance with claim 1, wherein each of the two shafts has two opposite ends each formed with a through hole for passage of an insertion pin.

13. The rope tensioning device in accordance with claim 1, wherein each of the two locking blocks is substantially Y-shaped.

14. The rope tensioning device in accordance with claim 1, wherein each of the two locking blocks is formed with a through hole for passage of the fixing pin.

15. The rope tensioning device in accordance with claim 1, further comprising two elastic members each pivotally mounted on the fixing pin and each having a first end and a second end each locked in the through hole and the opening of a respective one of the two fixing plates respectively.

16. The rope tensioning device in accordance with claim 1, further comprising a bolt extended through the second through hole of each of the two side walls of the support base and has a distal end screwed with a nut.

17. The rope tensioning device in accordance with claim 1, wherein one of the two side walls of the support base has an inner side formed with a boss, and one of the two side plates of the connecting portion of the handle has an outer side formed with a locking hole for locking the boss of the support base, so that the two ratchet wheels are fixed without slip.

18. The rope tensioning device in accordance with claim 1, wherein the handle is replaced by a substantially U-shaped handle which has a mediate portion provided with a fixing pin.

* * * * *